United States Patent [19]

Bober

[11] Patent Number: 5,067,576
[45] Date of Patent: Nov. 26, 1991

[54] VARIABLE EFFORT STEERING SYSTEM

[75] Inventor: Gregory D. Bober, Grosse Pointe Woods, Mich.

[73] Assignee: Ford Motor Company, Dearborn, Mich.

[21] Appl. No.: 567,578

[22] Filed: Aug. 15, 1990

[51] Int. Cl.$^5$ .............................................. B62D 5/04
[52] U.S. Cl. ................................ 180/79.1; 180/143; 318/432; 364/424.05
[58] Field of Search ...................... 180/79.1, 142, 143; 318/432, 434; 364/424.05

[56] References Cited

U.S. PATENT DOCUMENTS

| | | | |
|---|---|---|---|
| 2,930,247 | 3/1960 | Zinn | 74/388 |
| 4,418,931 | 12/1983 | Howard | 280/94 |
| 4,522,279 | 6/1985 | Kanazawa | 180/143 |
| 4,524,842 | 6/1985 | Kanazawa | 180/132 |
| 4,751,976 | 6/1988 | Higuchi et al. | 180/79.1 |
| 4,856,607 | 8/1989 | Sueshige et al. | 180/79.1 |
| 4,946,001 | 8/1990 | Taniguchi et al. | 180/79.1 |
| 4,956,590 | 9/1990 | Phillips | 318/432 |
| 4,961,033 | 10/1990 | Hirota | 318/432 |
| 4,984,646 | 1/1991 | Sano et al. | 180/79.1 |
| 4,986,380 | 1/1991 | Morishita | 180/79.1 |

Primary Examiner—Mitchell J. Hill
Attorney, Agent, or Firm—Frank G. McKenzie; Roger L. May

[57] ABSTRACT

A variable effort steering system disclosed herein changes the steering effort required to maneuver a vehicle which lacks power-assisted steering by modifying an electromagnetically applied holding torque exerted upon the steering shaft. By increasing or decreasing the applied holding torque, a change in the steering wheel's resistance to movement can be sensed by the driver. The device of the present invention allows the same high mechanical advantage steering gear ratio having a mechanical advantage to be deployed effectively over the spectrum of vehicle dynamic states. The resistive force exerted is a function of any dynamic state of the vehicle, such as its speed, thereby producing, for example, high speed steering stability. The variable effort steering system proposed includes a variable load actuator having a rotary member which is mounted upon the steering shaft, a stationary member surrounding the rotary member and at least one core which extends towards the rotary member. Windings are provided around the cores. When a current is delivered through the windings, a magnetic field is produced and a holding torque is exerted on the rotary member. The holding torque resists the turning motion of the rotary member, the steering shaft, and consequently, the manually applied torque.

17 Claims, 4 Drawing Sheets

VARIABLE EFFORT STEERING SYSTEM

TECHNICAL FIELD

The present invention relates generally to improvements in power steering mechanisms for automotive vehicles. More particularly, the present invention relates to an apparatus for providing variable effort steering using a variable electromechanical load for installation in vehicles which lack a power steering system.

BACKGROUND ART

In many older vehicles, and contemporary economy and sports vehicles, no power-assisted steering device is provided. In such vehicles, considerable effort may be expended to rotate the steering wheel. Such vehicles may not have a power assisted steering device for many reasons, such as weight conservation and cost reduction. A common problem with non-power assist steering vehicles is that there is a trade off between low speed turning effort and high speed steering stability. As the number of turns lock-to-lock increases, turning effort decreases.

As is commonly known, steering ratio is generally defined by the ratio of the rotating angle of the steering wheel to the angle by which the dirigible wheels are turned as a result of rotating the steering wheel by the rotating angle. Generally, it is preferable when the vehicle is at rest or moving at a low speed to select the steering ratio so that the dirigible wheels can be turned through a relatively large angle with a small amount of driver-supplied input torque to the steering wheel, thereby reducing the steering effort required of the driver. On the other hand, while the vehicle runs at high speed, the steering ratio should be so selected as to prevent oversteering and to minimize the influence of crosswinds, adverse road contours and the like, thereby providing steering stability.

In conventional steering devices, the steering ratio has a fixed value over almost the entire range of vehicle speeds, thereby making it impossible to meet the requirements of low steering effort at low speeds together with high speed steering stability. The steering ratio is conventionally determined at an intermediate value as a compromise between these two conflicting requirements.

There has been disclosed in the Mazda U.S. Pat. Nos. 4,524,842 and 4,522,279 a variable ratio power steering device in which the steering ratio can be altered according to vehicle speed. However, the inventions disclosed by these patents are adaptable only to vehicles which are provided with a power-assisted steering system. Additionally, the approach taken in these disclosures calls for a system which adds considerably to vehicle weight, requires a number of moving parts, and is relatively expensive to install.

It would therefore be desireable to provide a non-power assisted steering system which can be modified to provide variable effort steering, in which there are no additional moving parts. It would also be useful to provide a variable effort steering system which allows the use of steering gears which are suitable for providing a decrease in the amount of low speed steering effort required of the driver to maneuver the vehicle, while affording high speed steering stability by increasing steering effort. As a result, such a system would readily improve vehicles which do not have power assisted steering equipment.

SUMMARY OF THE INVENTION

The present invention solves the above problems and addresses the consequent needs by providing a variable effort steering system for use on vehicles which lack power steering. The variable effort steering system disclosed herein changes the manual effort required to maneuver a vehicle that lacks power steering assist by modifying a electromagnetic holding torque which is applied to the steering shaft. By increasing or decreasing the applied holding torque, a change in the steering wheel's resistance to movement can be sensed by the driver. The sensation experienced by the driver at the steering wheel is akin to the steering feel that can be perceived when the steering assist is varied on a conventional variable assist power steering system.

The device of the present invention provides the same low steering gear ratio and high mechanical advantage to be deployed by applying an electromechanical force to resist rotation of the steering wheel, the resistive force corresponding to a dynamic state of the vehicle, such as its speed, thereby producing, for example, high speed steering stability.

The variable effort steering system disclosed herein includes a variable load actuator having a rotary member which is mounted upon the steering shaft, a stationary member surrounding the rotary member, and at least one core which extends towards the rotary member. Windings are provided around the cores. When a current is delivered through the windings, a magnetic field is produced and a holding torque is exerted on the rotary member. The holding torque resists turning motion of the rotary member, the steering shaft, and consequently, the manually applied torque.

The invention includes a sensor which detects the dynamic state of the vehicle, such as vehicle speed, lateral acceleration of the vehicle, rate of angular movement of the steering wheel, or its angular position. An electronic control module is connected to the sensor and the variable load actuator. The electronic control module includes means for generating a first electrical signal representing the dynamic state of the vehicle and means for varying the current. The current varying means includes a timing circuit including means for measuring and storing over time a mean value of first electrical signal and a mean value of the current.

A comparator circuit is in communication with the timing circuit. The comparator circuit includes means for determining or retrieving a desired current corresponding to the dynamic state of the vehicle and means for comparing the mean current with the desired current. Proportionate to the result of the comparison, there is also provided means for generating a second electrical signal and means for generating current changes in communication therewith and with the windings.

The variable effort steering system delivers current changes to the windings in response to the dynamic state of the vehicle. As a result, the holding torque exerted on the rotary member by the stationary member is modified by changes in the holding torque. The effect is to change the manually applied torque required to maintain the vehicle along a desired path. This torque changes in accordance with the vehicle's dynamic state, such as the rotation rate of the steering wheel. When this rotation rate is high for example, in emergencies and evasive maneuvers there is a need for prompt manual inputs unimpeded by an electromagnetic holding torque.

The objects, features, and advantages of the present invention are readily apparent from the following detailed description of the best mode for carrying out the invention when taken in connection with the accompanying drawings.

BEST MODES FOR CARRYING OUT THE INVENTION

Figure 1:
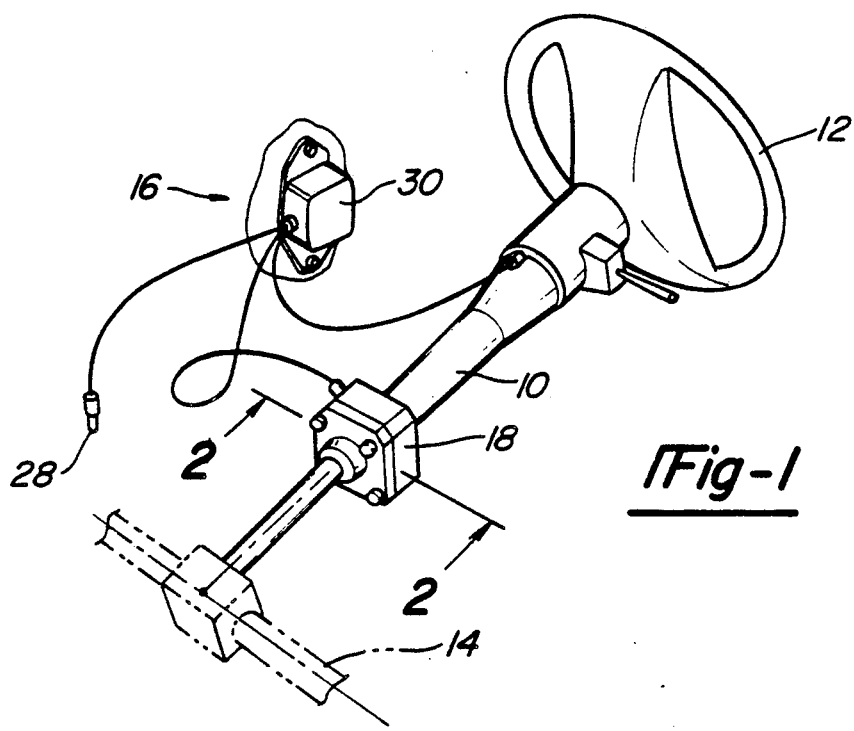
FIG. 1 is a perspective view showing a variable effort steering system in accordance with the present invention including a variable load actuator.

Referring first to FIG. 1, there is depicted a steering shaft 10 which is disposed within a vehicle having a frame. As is well known, the steering shaft 10 receives a torque applied manually by a driver through a steering wheel 12. The steering shaft 10 transmits the manually applied torque through a steering gear 14 to steerable wheels (not shown). Noteworthy is the absence of any power assist rendered to the steering gear 14.

Figure 2:
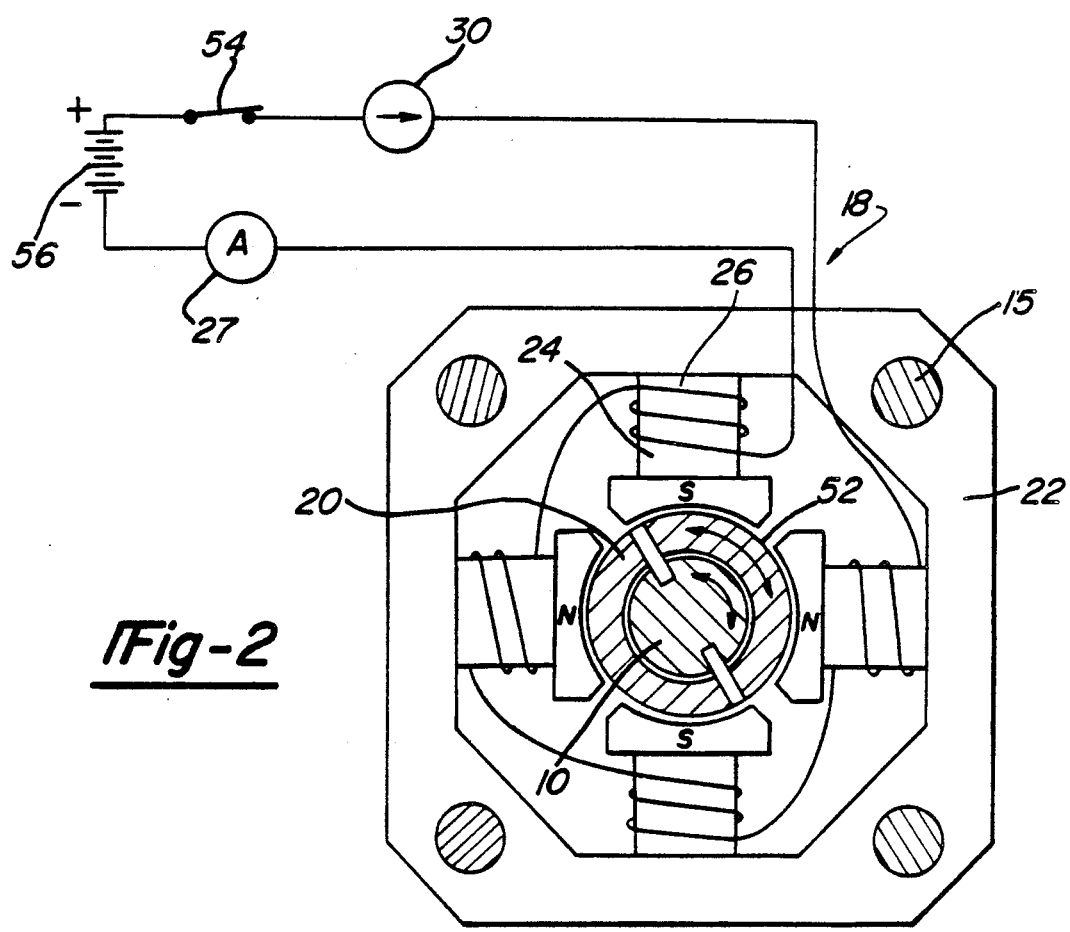
FIG. 2 is an enlarged cross-sectional view of the variable load actuator shown in FIG. 1, taken along the line 2—2 thereof.

Generally indicated by the reference numeral 16, a variable effort steering system disclosed herein comprises a variable load actuator 18 which is mounted on the frame. Referring now additionally to FIG. 2, it may be seen that included in the variable load actuator 18 is a ferromagnetic rotary member 20 which is fixedly mounted upon the steering shaft 10. The rotary member 20 and steering shaft 10 turn together in response to the manually applied torque. At least partially surrounding the rotary member 20 is a stationary member 22. The stationary member 22 includes at least one core 24 which extends towards the rotary member 20. Windings 26 surround at least one of the cores 24. When a current ($I_A$) is delivered by a voltage source 56 through the windings 26, a magnetic field is produced. Magnetic coupling between the stationary and rotary members (22,20) generates a holding torque (T) which is thereby exerted on the rotary member 20. The holding torque (T) resists the manually applied torque and turning motion of the rotary member 20 in combination with the steering shaft 10. To monitor and display the current ($I_A$), means for measuring the current ($I_A$) 27 are provided in communication with the windings 26.

Since electromagnetically induced resistance to the holding torque is ideally variable depending on the dynamic state of the vehicle, a sensor 28 is mounted on the frame for sensing the vehicle's dynamic state. In communication with the sensor 28 is an electronic control module 30 which is also mounted on the frame.

Figure 3:
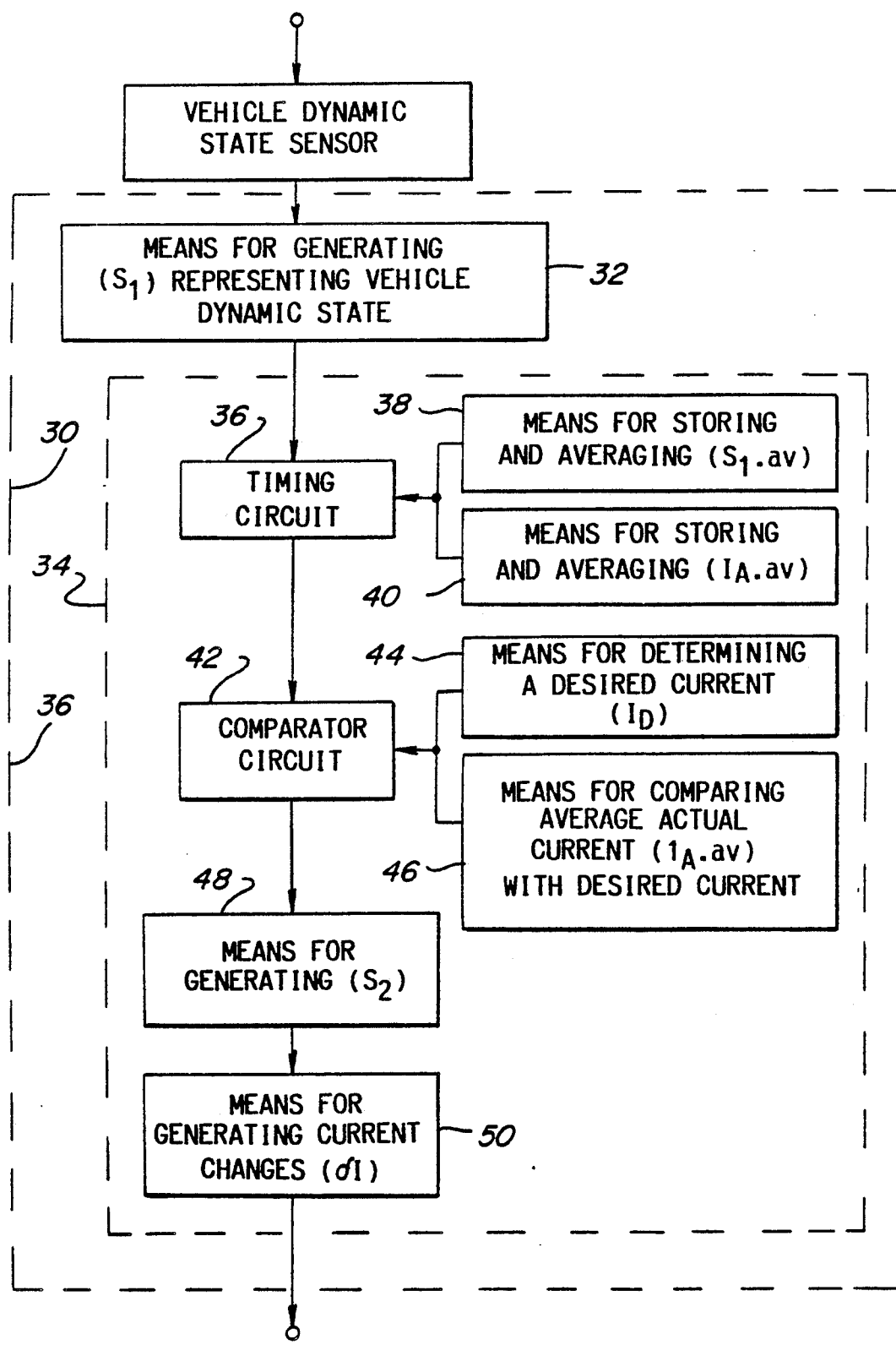
FIG. 3 is a block diagram illustrating the structural and functional interrelationships of components involved in the variable effort steering system of the present invention.

Referring now to FIG. 3, the electronic control module 30 includes means for generating a first electrical signal ($S_1$) 32 which represents the dynamic state of the vehicle such as its speed. That generating means 32 is in communication with the sensor 28.

Next, there is provided means for varying the current ($I_A$) 34. The current varying means 34 includes a timing circuit 36 which is in communication with the first electrical signal generating means 32. Included in the timing circuit 36 are means for measuring and storing over time ($\delta t$) a mean value of the first electrical signal ($S_{1AV}$) 38 and a means for measuring and storing over time ($\delta t$) a mean value of the current ($I_{AAV}$) 40.

In communication with the timing circuit 36 is a comparator circuit 42 which includes means for determining a desired current ($I_D$) 44 corresponding to the dynamic state of the vehicle. The comparator circuit 42 also includes means for comparing the mean current ($I_{AAV}$) with the desired current ($I_D$) 46.

The means for varying the current ($I_A$) 34 also includes means for generating a second electrical signal ($S_2$) 48 which is proportionate to the result of the comparison. In communication with the second signal generating means 48 are means for generating current changes ($\delta I$) which are in communication with the windings 26.

As will now be apparent, the variable effort steering system 16 delivers current changes ($\delta I$) to the windings 26 in response to the second electrical signal ($S_2$). The holding torque (T) is modified by changes ($\delta T$) exerted on the rotary member 20 by the stationary member 22 as a result of the current changes ($\delta I$) flowing through the windings 26. As a result, the manually applied torque required to maintain the vehicle along a desired path is changed in accordance with the vehicle's dynamic state.

Figure 4:
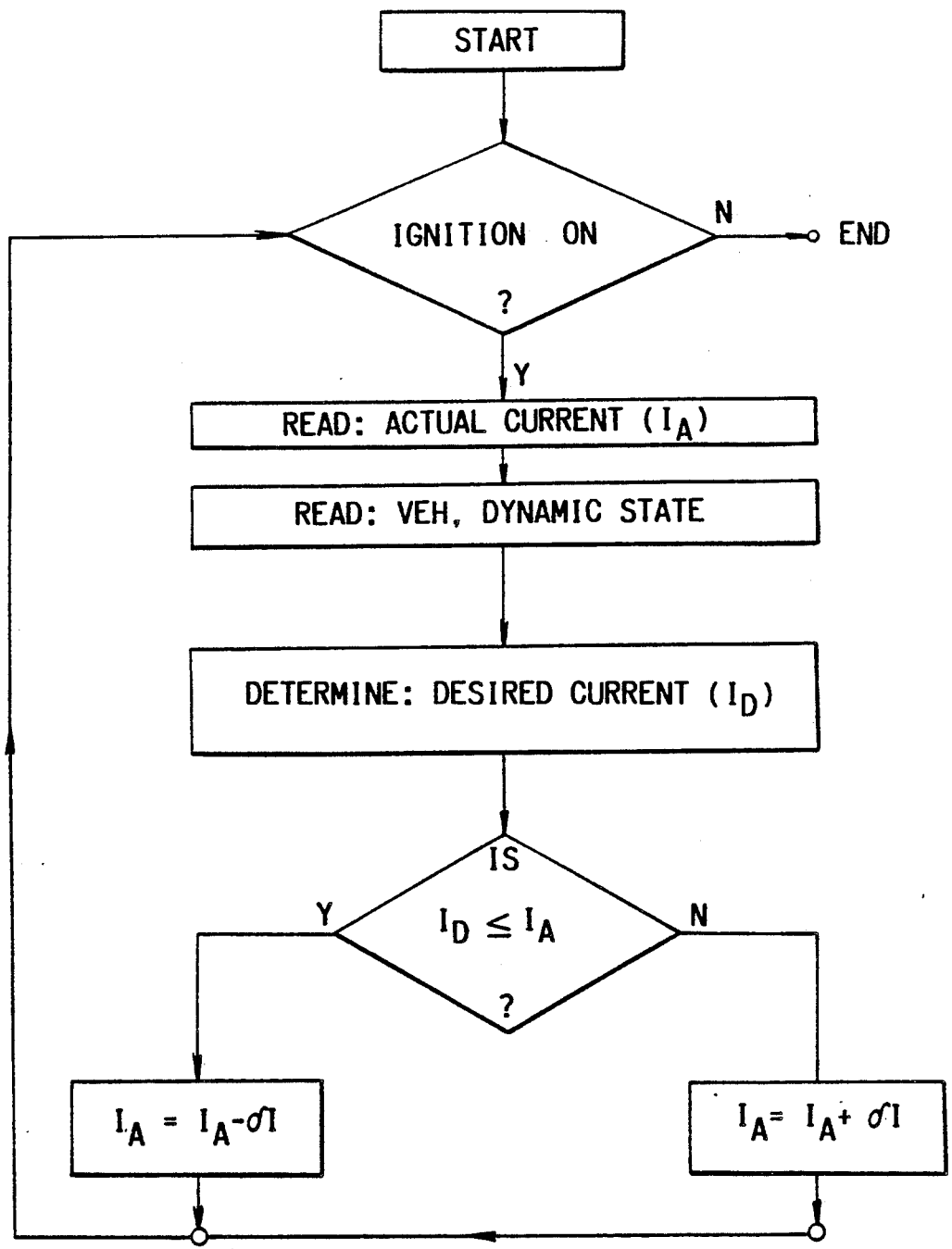
FIG. 4 is a process and logic flow diagram depicting method steps involved in the variable effort steering system of the present invention.

FIG. 4 illustrates the logic flow of process steps executed by the electronic control module 30 shown in FIGS. 2 and 3. When the vehicle's ignition is turned on, the actual current ($I_A$) is measured by the means for measuring the current by the ammeter 27. The vehicle's dynamic state is determined by sensor 28.

The desired current ($I_D$) is determined either by a formula where one independent variable represents the vehicle's dynamic state or by a table look-up function if more than one independent variable is involved. A comparison is then made between the desired ($I_D$) and actual ($I_{AAV}$) currents. To move the actual current in the direction of the desired current, if the desired current is less than or equal to the actual current, the actual current is diminished by an amount ($\delta I$). Conversely, if the desired current is greater than the actual current, the actual current is augmented by an amount ($\delta I$) and the process is then repeated. In practice, the means for varying the current ($I_A$) is a potentiometer. An alternate embodiment of the means for varying the current ($I_A$) is a transistor.

As an example, depending on the circuitry used, the actual current may have a value between 0 and 3 amps. Suppose that for a given current, the desired holding torque is about 24 inch-ounces. Consider a vehicle at rest or operating at low speeds. In such a vehicle dynamic state, the desired current should be zero or minimal, thereby leaving undisturbed by any electromechanical influences the natural effect of a low steering ratio and low effort required of the driver to manipulate the vehicle.

Figure 5:
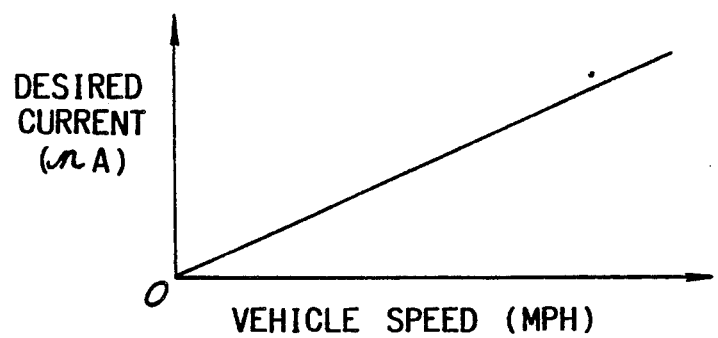
FIG. 5 is an illustrative graph showing a relationship of a desired current required to produce a given holding torque versus a dynamic state of the vehicle, where the dynamic state is vehicle speed.

As shown in FIG. 5, as vehicle speed increases, the desired current ($I_D$) also increases, but the relationship need not be linear. Consider a case where the dynamic state of the vehicle under consideration is its speed. When vehicle speed is 60 m.p.h. for example, the desired current ($I_D$) may be about 2 amps. Ideally, the rate of increase of current ($\delta I$) with vehicle speed approximates to about 1/30 amps per mile per hour.

To provide a smooth application of electromechanical influences exerted by the variable effort steering system, observations of actual current ($I_A$), desired current ($I_D$) and vehicle dynamic state are made at the approximate rate of one observation of each value per ten milliseconds ($\delta t = 10$ milliseconds). Pulses or changes in the actual current ($\delta I$) may be injected, for example, at a rate of about once each 5 milliseconds.

As mentioned earlier, the sensor 28 is adapted to sense various dynamic states of the vehicle. Discussed above was an example in which the dynamic state of a vehicle under consideration was its speed. In an alternate embodiment of the present invention, the sensor 28 detects independently vehicle speed, the rate of angular movement of the steering wheel, and steering wheel rotation rate. As the steering wheel rotation rate increases at a given vehicle speed, it is desirable to diminish the electromagnetically applied holding torque (T) exerted by the stationary member 22 on the rotary member 20. This condition may apply during emergencies and in other situations where evasive maneuvers are to be executed.

Figure 6:
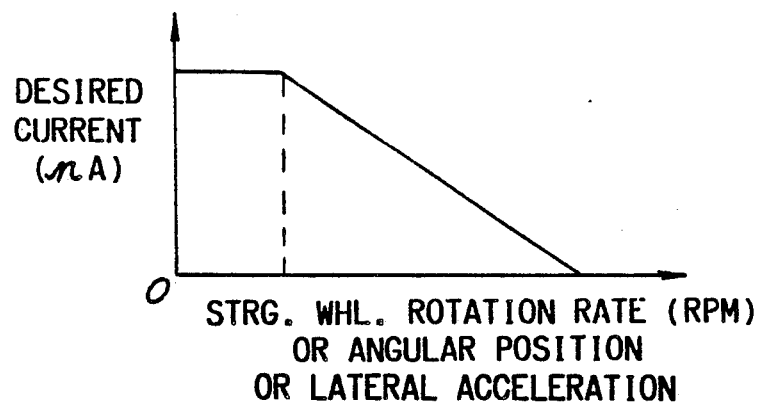
FIG. 6 is an illustrative graph showing a relationship of a desired current required to produce a given holding torque versus dynamic states of the vehicle, where the dynamic state under construction is steering wheel rotation rate, or its angular position.

FIG. 6 illustrates this type of situation. In FIG. 6, the desired current ($I_D$) diminishes with increasing steering wheel rotation rate after a given steering wheel rotation rate has been reached. When this happens, the high mechanical advantage afforded by the low steering ratio allows the evasive steering maneuver to be executed unimpeded by the electromechanically applied holding torque (T).

Also illustrated in FIG. 6 is a decay in the desired current ($I_D$) with increasing angular position of the steering wheel. In some situations, such as when the steering wheel position is close to the limits of rotational travel, it is desirable to decrease the holding torque applied by the variable load actuator 18. Similar observations are applicable to situations where the sensor 28 detects other dynamic states of the vehicle, such as its lateral acceleration. In evasive maneuvers or in emergencies, the vehicle may be skidding or sliding sideways and be accelerating laterally. To enable a driver to correct the situation by turning the dirigible wheels into the direction of the skid, it would be desirable to allow him relative freedom to execute the desired steering inputs without his needing to overcome an electromechanically applied holding torque.

It will now be apparent in light of the foregoing discussion, that alternate embodiments of the invention include variable effort steering systems wherein the actual current ($I_A$) is varied in accordance with vehicle speed and the angular position of the steering wheel. Alternatively, the actual current ($I_A$) may be determined as a function of the vehicle speed and the rate of angular movement of the steering wheel. In another embodiment, the actual current ($I_A$) may be determined as a function of the vehicle speed, the rate of angular movement of the steering wheel, and the angular position of the steering wheel.

Referring back now to FIG. 2, it will be appreciated that the variable effort steering system of the present invention includes a configuration in which at least one core 24 terminates adjacent the rotary member 20 so that a gap 52 is formed therebetween. It has been found that the dimensions of the gap 52 are among those factors which influence the holding torque (T). Other factors include the number of turns in the windings 26, the actual current ($I_A$), the diameter of the rotary member 20, and the material of which it is made.

Continuing with reference to FIG. 2, it will be appreciated that the rotary member 20 may take different forms without departing from the spirit or scope of the present invention. For example, the rotary member 20 may be a squirrel cage similar to that found in conventional alternating current induction motors.

The variable effort steering system 16 discussed thus far contemplates the use of a direct current ($I_A$). The DC voltage source 56 is in communication with an ignition switch 54 and the means for measuring the current ($I_A$), such as an ammeter 27. The DC voltage source 56 can be, for example, a battery or another type of power supply.

As illustrated in FIG. 2, there are four cores 24, although it will be appreciated that other numbers of cores 24 are possible.

In light of the foregoing description, it will be apparent that there has been disclosed a variable effort steering system which controls the amount of steering effort that is used by the driver to maneuver a vehicle that lacks a power steering system. The variable load actuator includes no additional moving parts and changes the manual steering effort required by the driver to maintain the vehicle along a desired path. The variable effort steering system affords the vehicle designer the opportunity to invoke the benefits of a low steering gear ratio which affords a high mechanical advantage throughout a wide range of vehicle dynamic states. The variable load actuator of the present system provides smooth and instantaneous response over a range of dynamic states of the vehicle, including evasive maneuvers. The variable effort steering system disclosed in the present invention therefore provides an improvement to vehicles lacking power assist equipment by adding a variable effort steering system which is relatively inexpensive and easy to install.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

We claim:

1. In a vehicle having frame which supports a steering shaft for receiving torque applied manually by a driver through a steering wheel and for transmitting the manually applied torque through a steering gear to steerable wheels without power assist, a variable effort steering system comprising:

a variable load actuator including a rotary member mounted upon the steering shaft, said rotary member and the steering shaft turning together in response to the manually applied torque;

a stationary member at least partially surrounding said rotary member and including at least one core extending towards said rotary member; and windings surrounding at least one of said at least one core, so that when a current ($I_A$) is delivered through said windings, a magnetic field is produced and a holding torque (T) is exerted on said rotary member, the holding torque (T) resisting the manually applied torque and turning motion of said rotary member and the steering shaft;

means for measuring a current ($I_A$) in communication with said windings;

a sensor mounted on the frame for sensing a dynamic state of the vehicle; and an electronic control module mounted on the frame, including means for generating a first electrical signal ($S_1$) representing the dynamic state of the vehicle, said means for generating being in communication with said sensor; and means for varying the current ($I_A$) in response to said first electrical signal ($S_1$), said means for varying the current ($I_A$) being in communication with said windings of said variable load actuator and producing changes to the holding torque (T) exerted thereby upon the steering shaft in response to the dynamic state of the vehicle, thereby changing in accordance with the vehicle's dynamic state the manually applied torque required to maintain the vehicle along a desired path.

2. The variable effort steering system of claim 1, wherein said at least one core terminates adjacent said rotary member so that a gap is formed therebetween.

3. The variable effort steering system of claim 1, wherein the current ($I_A$) is a direct current.

4. The variable effort steering system of claim 1, wherein said at least one core comprises four cores.

5. The variable effort steering system of claim 1, wherein the dynamic state of the vehicle sensed by said sensor is vehicle speed.

6. The variable effort steering system of claim 1, wherein the dynamic state of the vehicle sensed by said sensor is lateral acceleration.

7. The variable effort steering system of claim 6, wherein the desired current ($I_D$) diminishes as lateral acceleration increases, thereby permitting the driver to apply prompt steering correction during skidding.

8. The variable effort steering system of claim 1, wherein the dynamic state of the vehicle sensed by said sensor is a rate of angular movement of the steering wheel.

9. The variable effort steering system of claim 8, wherein the desired current ($I_D$) diminishes as the rate of angular movement of the steering wheel increases, thereby decreasing the holding torque (T) during evasive maneuvers.

10. The variable effort steering system of claim 1, wherein the dynamic state of the vehicle sensed by said sensor is an angular position of the steering wheel.

11. The variable effort steering system of claim 10, wherein the desired current diminishes as the angular position of the steering wheel increases, thereby decreasing the holding torque (T) when maneuvering the vehicle in a tight turn.

12. The variable effort steering system of claim 1, wherein the dynamic state of the vehicle sensed by said sensor is vehicle speed, a rate of angular movement of the steering wheel, and an angular position of the steering wheel.

13. The variable effort steering system of claim 1, wherein the dynamic state of the vehicle sensed by said sensor is vehicle speed and an angular position of the steering wheel.

14. The variable effort steering system of claim 1, wherein the dynamic state of the vehicle sensed by said sensor is vehicle speed and a rate of angular movement of the steering wheel.

15. In a vehicle having frame which supports a steering shaft for receiving torque applied manually by a driver through a steering wheel and for transmitting the manually applied torque through a steering gear to steerable wheels without power assist, a variable effort steering system comprising:

a variable load actuator including a rotary member mounted upon the steering shaft, said rotary member and the steering shaft turning together in response to the manually applied torque; a stationary member at least partially surrounding said rotary member and including at least one core extending towards said rotary member; windings surrounding at least one of said at least one core; and means for measuring a current ($I_A$) in communication with said windings which is delivered through said windings, a magnetic field being produced by said windings and a holding torque (T) being exerted on said rotary member, the holding torque resisting the manually applied torque and turning motion of said rotary member and the steering shaft;

a sensor mounted on the frame for sensing a dynamic state of the vehicle; and an electronic control module mounted on the frame, including:

means for generating a first electrical signal ($S_1$) representing a dynamic state of the vehicle, said means for generating being in communication with said sensor; and means for varying the current ($I_A$), including:

a timing circuit in communication with said means for generating a first electrical signal ($S_1$), said timing circuit having means for measuring and storing over time ($\delta t$) a mean value of said first electrical signal ($S_{1.AV}$) and means for measuring and storing over time ($\delta t$) a mean value of said current ($I_{A.AV}$);

a comparator circuit in communication with said timing circuit, having means for determining a desired current ($I_D$) for the dynamic state of the vehicle, and means for comparing said mean current ($I_{A.AV}$) with said desired current ($I_D$);

means for generating a second electrical signal ($S_2$) proportionate to the result of the comparison; and means for generating current changes ($\delta I$) in communication with said windings, so that the variable effort steering system delivers current changes ($\delta I$) to said windings in response to said second electrical signal ($S_2$), said holding torque (T) being modified by changes in the holding torque ($\delta T$) exerted on said rotary member by said stationary member, thereby changing in accordance with the vehicle's dynamic state the manually applied torque required to maintain the vehicle along a desired path.

16. The variable effort steering system of claim 15, wherein said means for determining a desired current ($I_D$) for a dynamic state of the vehicle includes a matrix of values for the desired current ($I_D$) corresponding to the dynamic state of the vehicle.

17. The variable effort steering system of claim 15, wherein said means for determining a desired current ($I_D$) for a dynamic state of the vehicle includes a formula having the vehicle dynamic state as an independent variable and the desired current ($I_D$) as a dependent variable.

* * * * *